United States Patent
Moore (10) Patent No.: US 11,461,141 B2
(45) Date of Patent: Oct. 4, 2022

(54) METHODS TO DEAL WITH INSUFFICIENT MEMORY PROTECTION UNIT (MPU) REGIONS

(71) Applicant: Ralph Crittenden Moore, Costa Mesa, CA (US)

(72) Inventor: Ralph Crittenden Moore, Costa Mesa, CA (US)

(*) Notice: Subject to any disclaimer, the term of this patent is extended or adjusted under 35 U.S.C. 154(b) by 280 days.

(21) Appl. No.: 16/899,468

(22) Filed: Jun. 11, 2020

(65) Prior Publication Data
US 2021/0389988 A1   Dec. 16, 2021

(51) Int. Cl.
G06F 9/50 (2006.01)
G06F 3/06 (2006.01)
G06F 21/78 (2013.01)

(52) U.S. Cl.
CPC .......... *G06F 9/5016* (2013.01); *G06F 3/0604* (2013.01); *G06F 3/0644* (2013.01); *G06F 3/0673* (2013.01); *G06F 9/5077* (2013.01); *G06F 21/78* (2013.01); *G06F 2209/503* (2013.01)

(58) Field of Classification Search
CPC .... G06F 9/5016; G06F 9/5077; G06F 3/0604; G06F 3/0644; G06F 3/0673
See application file for complete search history.

(56) References Cited

U.S. PATENT DOCUMENTS

2015/0371046 A1* 12/2015 Chen .................. G06F 21/575
                                                                    713/2
2021/0374293 A1* 12/2021 Bartling ............... G06F 3/0647

* cited by examiner

*Primary Examiner* — Edward J Dudek, Jr.

(57) ABSTRACT

This invention presents methods to utilize more regions for tasks than the number of slots in a memory protection unit and to efficiently distribute regions between multiple tasks within a partition.

9 Claims, 7 Drawing Sheets

METHODS TO DEAL WITH INSUFFICIENT MEMORY PROTECTION UNIT (MPU) REGIONS

PROGRAM LISTINGS mpu.c contains the Memory Protection Array (MPA) region move and other MPA and MPU functions.
mpu.h provides macros necessary to define MPU regions and MPAs.
xtask.c contains task create function with protected stack.
tmpu.c provides demo code showing the use of auxiliary MPA slots and partition templates.

In order to run the foregoing code, it is necessary to have an evaluation copy of the SecureSMX RTOS. This is available for free download from ftp://ftp.smxrtos.com/pub1/patent_mpu345.zip. In addition, the IAR EWARM v8.20.1 development tools are needed. A free evaluation kit for these tools is available at www.iar.com. Also necessary is an ST Micro STM32746G-EVAL2 evaluation board to run the code. If this board is not available contact support@smxrtos.com for assistance in using another board.

CROSS-REFERENCE TO RELATED APPLICATIONS

Reference material for this application can be found in:
1. U.S. Pat. No. 10,635,831 B1 "Method to Achieve Better Security Using a Memory Protection Unit, Apr. 28, 2020 by Ralph Crittenden Moore,
2. U.S. Ser. No. 16/746,559 "Enhanced Security Via Dynamic Regions for Memory Protection Units (MPUs), Jan. 17, 2020 by Ralph Crittenden Moore, which are incorporated herein by reference in their entirety. In addition, two other MPU-related applications are being submitted simultaneously, by this author, which may be helpful.

BACKGROUND

As embedded systems are drawn more into the Internet of Things (IoT), hacks and malware attacks are becoming increasingly frequent. Thus, security of embedded systems is becoming increasingly important. One tactic to improve security is to divide the software of an embedded system into many isolated partitions. Then if a hacker gains access to one partition he cannot access code or data in other partitions.

Most embedded systems use Micro Controller Units (MCUs), which have lower performance processors and much less memory than other computer systems such as servers, desktop computers, or even smart phones. For memory protection, MCUs normally provide Memory Protection Units (MPUs) rather than Memory Management Units (MMUs) as are found in more powerful processors. Because of this and due to the fact that all MCU embedded system code is linked into a single executable, achieving full partition isolation is much more difficult in these systems than it is in more powerful systems using MMUs.

Partition isolation is achieved in MCU systems by defining code and data regions which are unique to each partition. A region consists of contiguous memory with a memory starting address, a memory size, and memory attributes. The attributes supported depend upon the MPU, but typically include read/write, read only, and execute never. When a task in a partition starts running, regions for its partition are loaded into the MPU. The MPU insures that only memory in these regions can be accessed and only as permitted by each region's attributes. This is very effective at thwarting malware.

A large majority of MCU-based systems that are in use are based upon the Armv7 Cortex-M architecture. Unfortunately the MPU in this architecture is difficult to use. Hence, very little use has been made of it and development of algorithms and software to use it are practically non-existent. The recently released Armv8 Cortex-M architecture corrects some of the problems, but it is not in widespread use yet and it shares some limitations with the Armv7 architecture.

The standard method to create regions is to use compiler pragmas in the source code to define which code or data goes into which section. Then a linker command file defines which sections go into a linker block. To this are added region size and region alignment in the linker command file to produce a region block. MPUs covered by this invention may also have subregions and subregion disables, which permit a region block to more closely fit the actual size needed. Finally the linker command file defines where the blocks go in memory.

The most common MPU size is 8 slots. Unfortunately, this is often too few slots to hold enough regions for a running task such that the regions can be unique for the task. Even worse, some processors have MPUs with only 4 slots. As a consequence, it is often necessary to use regions that are common between tasks, or regions that span regions used by other tasks. Doing so results in tasks and partitions that are not fully isolated. This provides a hacker with a path from one partition to another, which reduces system security.

SUMMARY OF THE INVENTION

The subject matter of this invention is the introduction of methods to overcome MPU slot limitations and to use MPU slots more effectively. Three basic methods are included:

Adding auxiliary regions to a task's Memory Protection Array (MPA) above its active, task-switched regions. There are two types:
Expansion regions that share an active MPU slot into which each is loaded, as needed by the current task.
Phantom regions that are included in a task's active region and are used for protected messages.
Creating partition templates, instead of task templates. These contain all regions needed by the code in a partition. Then slave tasks are spawned from the partition main task to perform subfunctions for the main task. Each slave task utilizes a subset that fits into the MPU of the partition regions. This reduces the regions needed by the main task so that they also fit into the MPU. Bit masks are used select which regions are loaded into each task's MPA. A slave task inherits all limitations of the master task, except its bit mask.
If an MPU has more slots than necessary for active regions, using its lower slots for privileged regions that are loaded one time during initialization and used for initialization, after which they are used when interrupts and exceptions occur, to improve performance.

DETAILED DESCRIPTION

Figure 1:
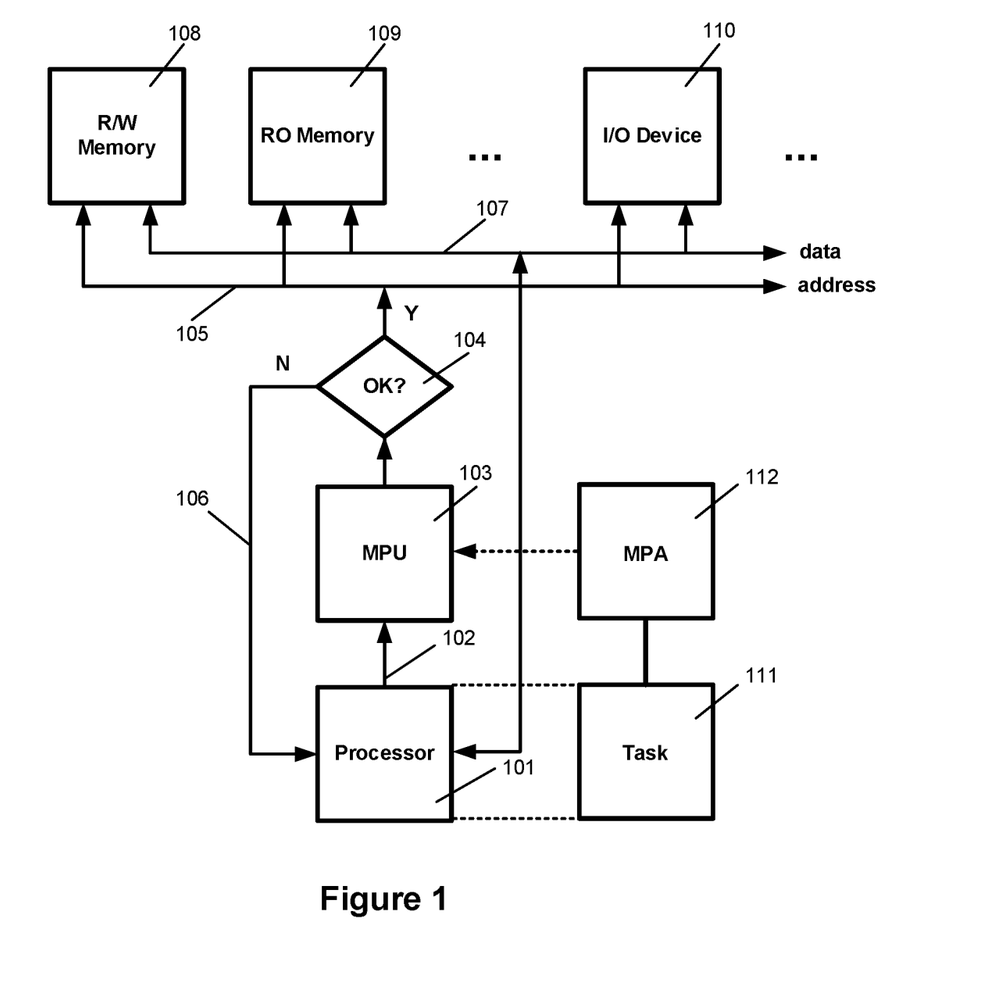
FIG. 1 shows the preferred embodiment of the inventive material herein.
Figure 2:
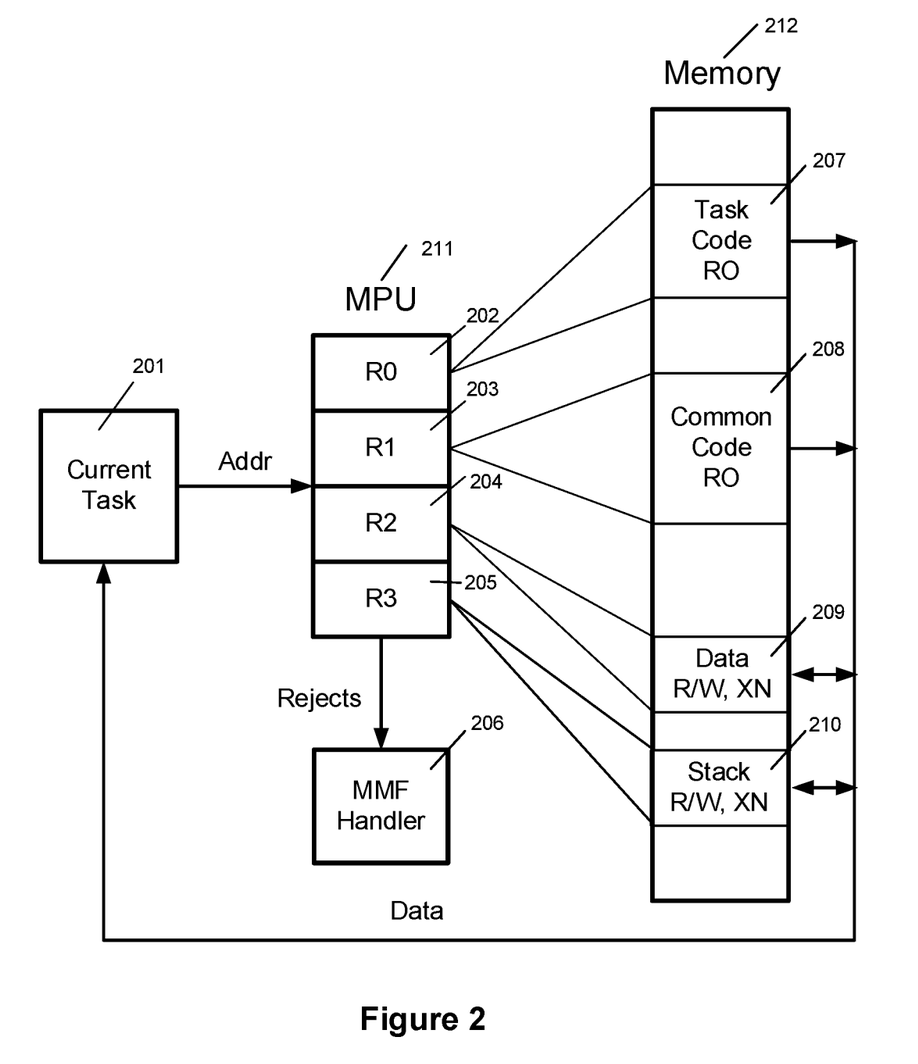
FIG. 2 illustrates MPU operation. Each region in the MPU allows access to a specific memory region with attributes, as shown.

The following information describes a simple embodiment of the invention sufficient to explain how it works. The term "application" is understood to mean the software in an embedded device that performs the functions of that device. FIGS. 1 and 2 illustrate the structure and operation of the preferred embodiment. They are for reference, only, and not part of the inventive material.

FIG. 1 shows the preferred embodiment of this invention consisting of processor 101 sending a memory address 102 to a Memory Protection Unit (MPU) 103. The MPU 103 compares the address 102 to its regions and passes the address on to the system address bus 105 if it is ok. Otherwise, MPU 103 sends a Memory Mange Fault (MMF) exception 106 back to processor 101 and no access to memory nor FO occurs.

If ok, address 102 is sent to Read/Write Memory 108, Read-Only Memory 109, and I/O Device 110 and any other memories or devices connected to address bus 105. Whichever of these devices recognizes the address then receives data from processor 101 via system data bus 107 or sends data to processor 101 via system data bus 107.

FIG. 1 also shows that MPU 103 is loaded from Memory Protection Array (MPA) 112 at the time that its task 111 starts running on processor 101. Each task 111 has its own MPA 112, which contains the regions that it is allowed to access.

It should be apparent, to one skilled in the art, that other embodiments are possible, such as: multiple processors (either multiple cores on the same chip or multiple processors on different chips), multiple MPUs each connecting to the same or to different system buses, multiple system buses, and other types of memory.

FIG. 2 illustrates typical MPU operation. It shows task 201 sending an address to MPU 211 having 4 regions, as follows: Region 202 addresses task code read-only region 207 in memory 212. Region 203 addresses common code read-only region 208. Region 204 addresses data read/write, execute-never region 209. Region 205 addresses stack read/write, execute-never Region 210. An address that does not fall into one of these regions or does not have the correct attributes goes to the Memory Manage Fault Handler (MMF) 206. Otherwise, task 201 is allowed to read or write the desired data.

For simplicity, FIG. 2 shows 4 MPU regions. However, it should be apparent, to one skilled in the art, that it applies equally to MPUs with 8, 16, or any other number of regions.

Figure 3:
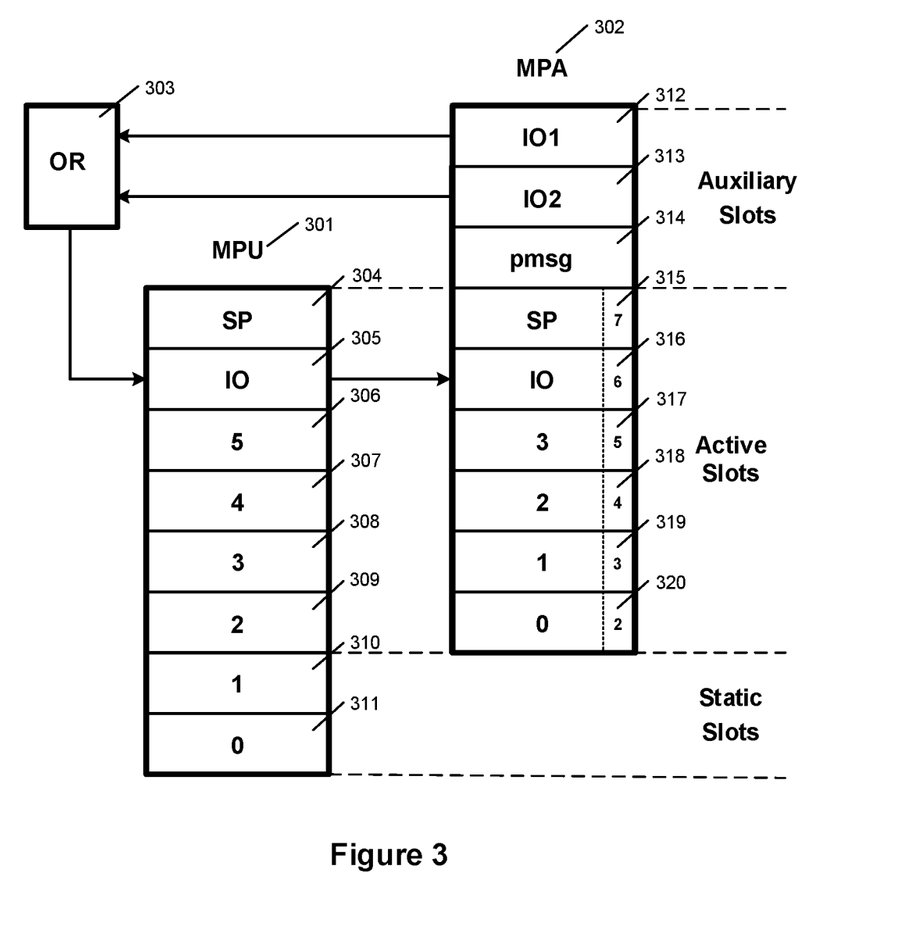
FIG. 3 illustrates one possible relationship between an MPU and a Memory Protection Array (MPA) and shows the resulting static, active, and auxiliary slots.

FIG. 3 Shows how MPU 301 and MPA 302 line up in one possible case. Here MPU slots 310 and 311 are static slots, which are not loaded from MPA 302 when a task switch occurs. Instead, they are loaded once by initialization code and typically contain system regions that are accessible only in pmode. MPU 301 active slots 304 thru 309 line up with MPA 302 slots 315 thru 320 and are loaded from them when a new task starts or resumes running.

Every task has its own MPA, which governs the regions that it can access. MPU 301 slot 304 is dedicated for the task stack region (every task has its own stack), slot 305 is dedicated for multiple IO regions, and slots 306 to 309 are used for current task regions. The small numbers in MPA 302 slots 315 to 320 are the corresponding MPU 301 slot numbers. This is required by the Cortex v7M MPU and is not generally needed by other MPUs.

MPA 302 slots 312 thru 314 are auxiliary slots. Slots 312 and 313 contain IO expansion regions. Either IO1 region in slot 312 or IO2 region in slot 313 can be selected 303 and loaded into MPU 301 slot 305 and into MPA 302 slot 316, depending upon which IO region is needed at a particular place in the code of the current task. MPA 302 slot 314 contains a phantom region. It contains region pmsg, which is a subregion of one of the regions in MPU 301 slots 304 to 309. Hence, the current task can access it. This subregion is made available to other partitions as a region that they are allowed to access for the purpose of exchanging data. It is the basis for tunnel partitions discussed in a concurrent application by this author.

Hence, in this particular example, the current task is able to access three more regions than MPU 301 would normally permit. It should be apparent to one skilled in the art that the foregoing is just one example of regions for a particular task and that other tasks may have different regions that suit their requirements.

Figure 4:
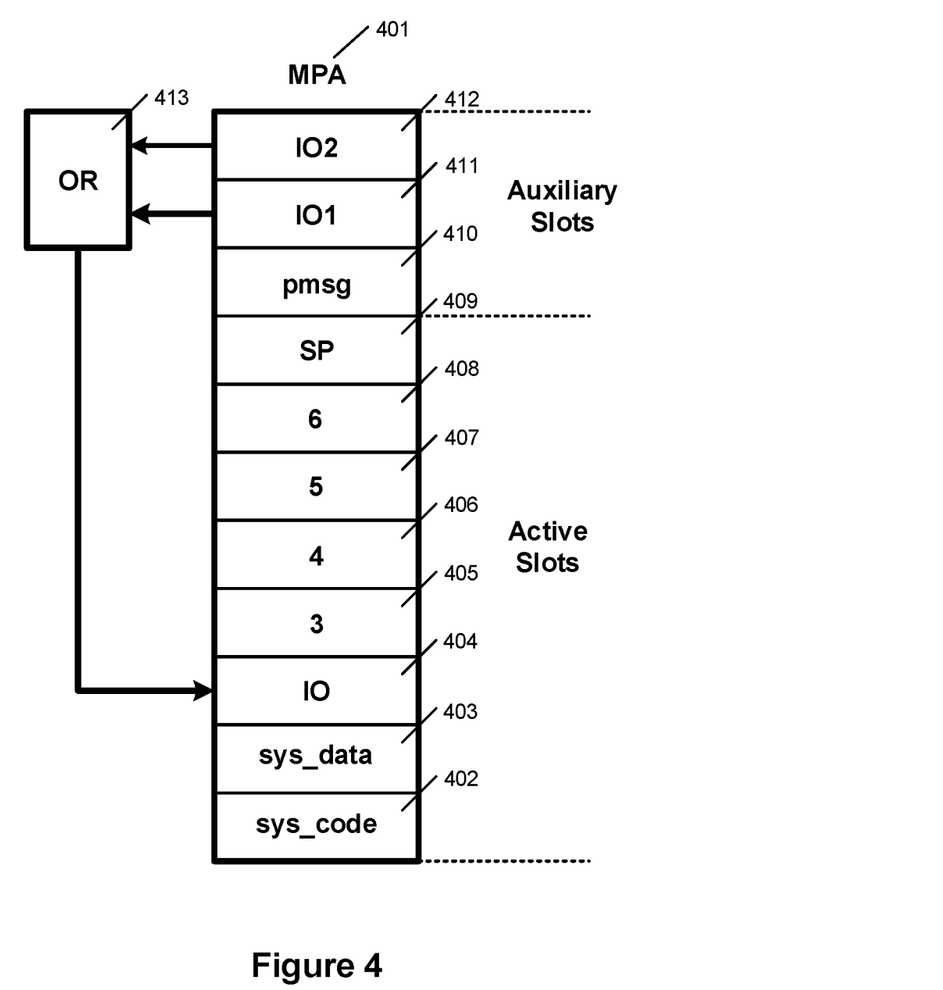
FIG. 4 illustrates an MPA for a ptask.

FIG. 4 shows MPA 401 for a ptask. Slots 402 and 403 contain privileged system regions. Unlike FIG. 3, MPA 401 is not offset from the MPU, hence slots 402 and 403 are active slots corresponding to MPU slots 0 and 1, respectively. Similarly to FIG. 3, slots 411 and 413 contain IO expansion regions, either of which can be selected 413 to be loaded into IO slot 404, as needed. Slots 405 thru 408 are for ptask regions. Slot 409 has the task stack region. It corresponds to the top MPU slot 7. Slot 410 contains a phantom region, the pmsg region.

Figure 5:
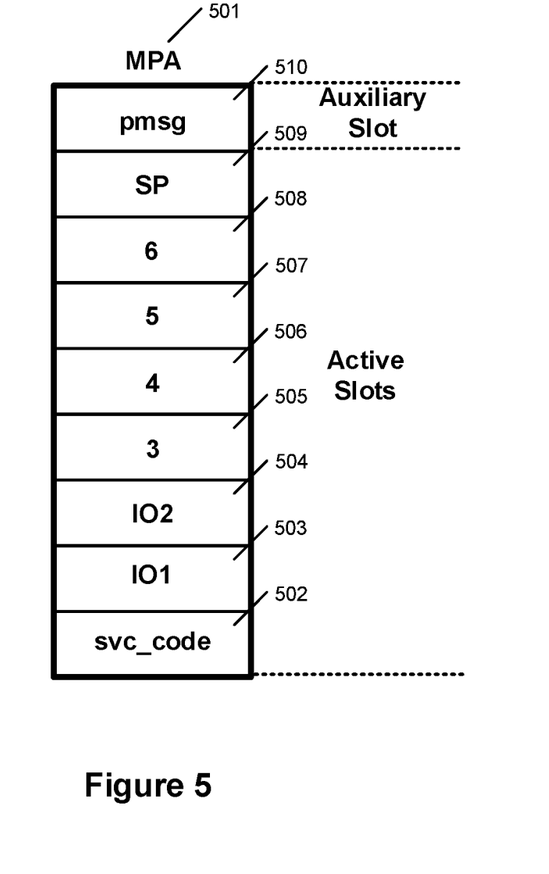
FIG. 5 illustrates the equivalent MPA for a utask that has the same code as the ptask.

FIG. 5 shows MPA 501 for the equivalent utask. MPA 501 is the utask equivalent of MPA 401 for a ptask. The utask is the same as the ptask, except that it is now running in umode. Note that sys_code in slot 402 had been replaced with svc_code in slot 502. svc_code contains functions necessary in umode, whereas sys_code contains functions necessary in pmode. Note that sys data in slot 403 is not necessary in umode. Hence slot 503 contains IO1 and slot 504 contains IO2. These regions have been moved from auxiliary slots 411 and 412, respectively, which are no longer needed. Slots 505 thru 509 contain the same regions as slots 405 thru 409, respectively. Now there is only one auxiliary slot 510 for pmsg. This figure illustrates how temporary auxiliary slots can be used for a ptask that become active slots when it is converted to a utask.

Figure 6:
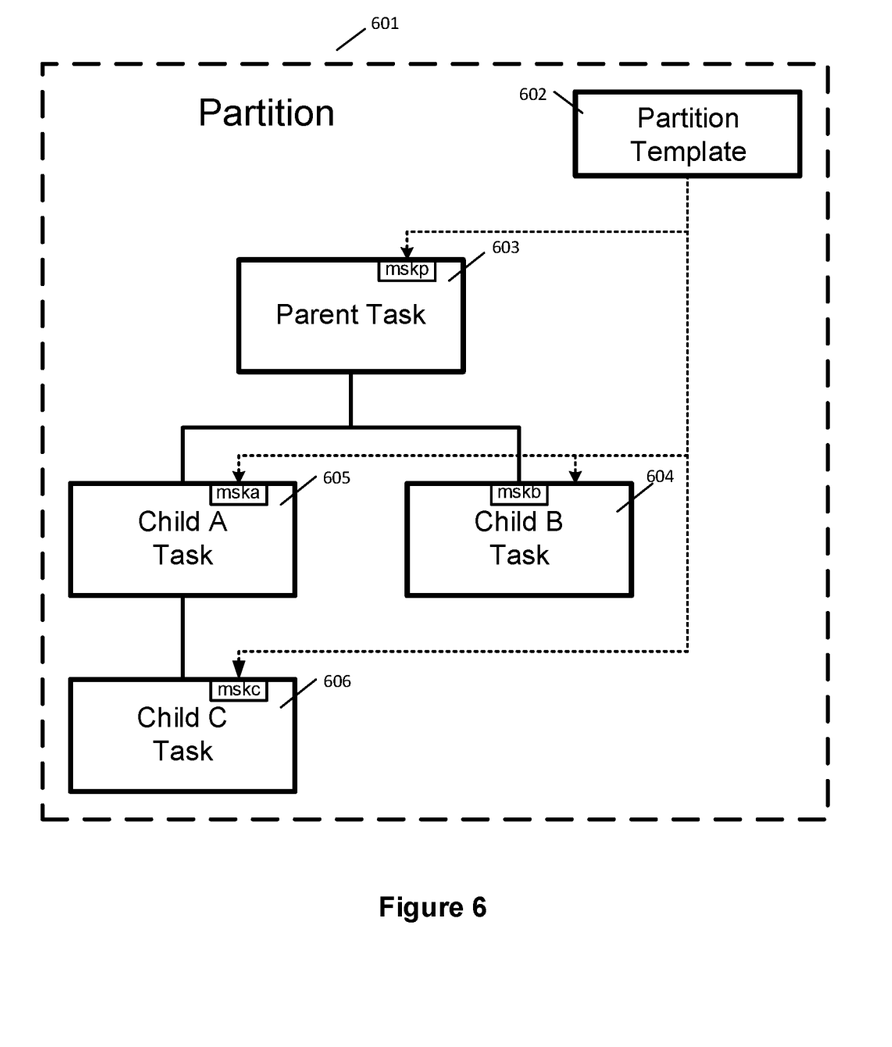
FIG. 6 shows a partition with a partition template, a parent or main task and three child tasks.

FIG. 6 Shows how child task A 605 and child task B 604 are spawned from parent task 603, all three using the partition template 602. In addition child task C 606 is spawned form its parent task 605 also using partition template 602. All tasks in partition 601 must use partition template 602, each with its own template mask, msk_, to select the regions that it needs.

Figure 7:
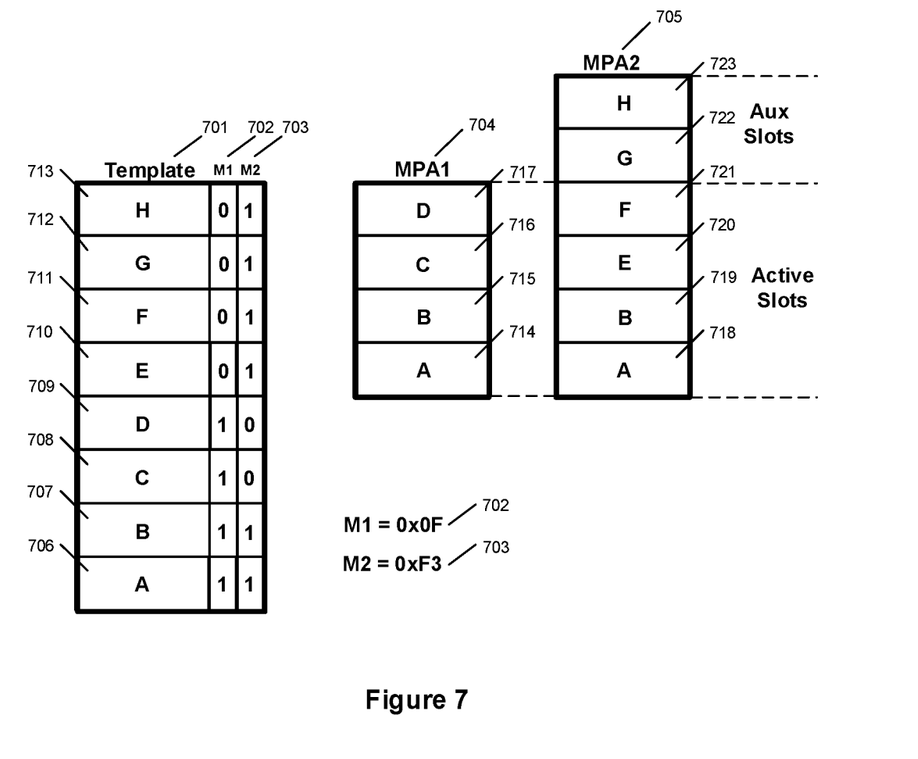
FIG. 7 shows loading two task MPAs from a partition template.

FIG. 7 illustrates how partition template 701 loads MPA1 704 using mask M1 702 and loads MPA2 705 using mask M2 703. In the first case, template 701 regions 706 thru 709 are loaded into MPA1 704 regions 714 thru 717, respectively, because the corresponding mask M1 702 bits are 1's.

The remaining mask bits are 0's so no further loading is done for MPA1 704. In the second case, template 701 regions 706 and 707 are loaded into MPA2 705 regions 718 and 719, respectively, because those bits in mask M2 703 are 1's. The next two bits in mask M2 703 are 0's so template 701 regions 708 and 709 are skipped. The template 701 regions 710 thru 713 are loaded into MPA2 regions 720 thru 723, respectively, because those bits in mask M2 703 are 1's. Note that template 701 has a mixture of active slots and auxiliary slots. As shown in FIG. 7, the hexadecimal value for mask M1 702 is 0x0F and for mask M2 703 it is 0xF3.

For simplicity, FIG. 7 shows MPAs with only 4 active slots. It should be apparent, to one skilled in the art, that the concept shown applies equally to larger numbers of active slots.

CONCLUSIONS, RAMIFICATIONS, AND SCOPE

As presented in the foregoing detailed descriptions, an MPU may be divided into static slots and active slots, if it has enough slots. The static slots are loaded during initialization and normally contain common regions and privileged regions used in pmode. The active slots correspond to the lower slots of the MPA from which the MPU is loaded when a new task starts or resumes. Thus the active slots contain regions specific to the current task, which is running. This structure improves performance and is appropriate for MPUs with a large number of slots, such as 16.

If the MPU has a moderate number of slots, such as 8, not only may there not be enough slots for static regions, there may not be enough slots for all active regions. As a consequence, it may be necessary to create larger regions or to share regions between partitions. Neither of these solutions is attractive because they reduce isolation between partitions and thus reduce system security. Unfortunately, the vast majority of MCUs in use have only 8-slot MPUs and some MCUs have only 4-slot MPUs. Hence, methods to employ more regions than available MPU slots are of great importance to achieve good security for MCU-based systems.

This invention adds auxiliary slots to a task's MPA. These can contain expansion regions and phantom regions that are specific to each task. Several expansion regions can share a single active MPU slot. When needed, the appropriate expansion region is loaded into the active MPU slot. Where in the code to place these region loads can be determined from Memory Management Faults (MMFs) when the task runs. Hence, neither redesign nor deep understanding of the code are necessary. Phantom regions are subregions of active regions. They are used to share data with other partitions and they do not require an active slot in the MPA of task of origin. This is the foundation for the tunnel portal presented in a concurrent application by this author.

An additional method of this invention to overcome insufficient MPU slots is to create a single partition template containing all regions needed by the partition code. These regions are based solely upon the code. The resulting template may be much larger than the available number of MPU slots. If so, special-purpose tasks are defined, each to execute a portion of the partition code, such that each task needs no more regions than there are MPU slots for it to use. These tasks are child tasks that are created by the main partition task, which becomes their parent task. A child task cannot do anything that its parent task cannot do, hence it is a proxy for the parent that is designed to reduce the regions needed by the parent.

Tasks are usually defined to perform certain functions, then writing the code follows. The unique idea here is that the partition code comes first, then the partition template that includes all regions needed by the code, then the tasks are defined to run the code such that the needed regions of each will fit into the MPU.

The invention claimed is:

1. Methods to utilize more regions for tasks than the number of slots in a memory protection unit (MPU) and to efficiently distribute said regions between multiple tasks within a partition, consisting of:
   creating a memory protection array (MPA) for each said task and offsetting said MPAs from said MPU such that lower MPU slots are static and upper MPU slots are active, wherein static means loaded one time during initialization and active means loaded from a task's MPA whenever said task starts running thus becoming the current task and where the sum of static and active slots is the number of MPU slots and there may be no static slots;
   defining regions to satisfy the requirements for code, data, and input/output in said partition then putting said regions into an array of regions called a partition template where such partition template may have more regions than the number of slots in said MPU;
   defining child tasks to perform subfunctions for said partition, each said child task requiring a subset of said partition regions for which said MPU has sufficient slots;
   creating a main partition task, which creates said child partition tasks;
   creating said MPAs by using MPA bit masks to select regions from said partition template for all said partition tasks.

2. The method of claim 1 wherein said MPA has lower active slots that correspond one for one with said MPU active slots and said MPA may have additional slots above said active MPA slots that are referred to as auxiliary slots and the total number of said MPA slots may vary from task to task.

3. The method of claim 2 wherein a said auxiliary slot of said MPA may contain an expansion region and wherein an expansion region load function is provided to load said expansion region into an active slot of said MPU and into said corresponding active slot of said MPA for said current task, thus allowing said current task to access said expansion region and said expansion region can be for data, code, or input/output.

4. The method of claim 3 wherein multiple said expansion regions are present in multiple said auxiliary slots of said MPA and one of said expansion regions is loaded ahead of code being executed by said current task called current task code that requires said expansion region and this process can be repeated for a multiplicity of said expansion regions, as needed, thereby increasing the number regions that said current task can access beyond the number of said active MPU slots.

5. The method of claim 4 wherein said current task may be a privileged task, called a ptask, or it may be an unprivileged task, called a utask, and said expansion regions in said ptask's MPA become said active regions in said utask's MPA when said ptask is converted to said utask, thus making said conversion easier since said utasks usually require less said regions than said ptasks.

6. The method of claim 4 wherein the places in said current task code where said expansion regions must be loaded into said MPU and into said MPA can be found from memory manage faults occurring when said current task runs.

7. The method of claim 4 wherein said current task may be preempted by another task and when said current task resumes, said expansion region is in said MPU slot because said expansion region was also loaded into said corresponding MPA slot of said current task.

8. The method of claim 2 wherein said auxiliary slot may contain a phantom region, which is a subregion of a region in a said active slot of said MPU and thus accessible by said current task and said phantom region is shared with a task in another partition which loads said subregion into a said active slot in its said MPA in order to exchange data between said tasks.

9. The method of claim 1 wherein said MPA bit mask has a bit for each region of said partition template and if said bit is one, the corresponding region of said partition template is put into an empty slot of said MPA and if there are less 1 bits in said MPA bit mask, the remaining slots in said MPA are filled with NULL regions.

\* \* \* \* \*